United States Patent
Hamada et al.

(10) Patent No.: US 9,799,931 B2
(45) Date of Patent: Oct. 24, 2017

(54) BATTERY BLOCK AND METHOD OF MANUFACTURING THE SAME

(75) Inventors: Hideaki Hamada, Hyoko (JP); Yukio Nishikawa, Osaka (JP); Kazunori Kurumaya, Hyogo (JP); Oose Okutani, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 458 days.

(21) Appl. No.: 13/813,307

(22) PCT Filed: May 8, 2012

(86) PCT No.: PCT/JP2012/003011
§ 371 (c)(1),
(2), (4) Date: Jan. 30, 2013

(87) PCT Pub. No.: WO2012/164828
PCT Pub. Date: Dec. 6, 2012

(65) Prior Publication Data
US 2013/0130084 A1 May 23, 2013

(30) Foreign Application Priority Data
May 30, 2011 (JP) .................................. 2011-120473

(51) Int. Cl.
*H01M 10/50* (2006.01)
*H01M 10/04* (2006.01)
(Continued)

(52) U.S. Cl.
CPC ......... *H01M 10/5008* (2013.01); *B21C 37/14* (2013.01); *H01M 2/1077* (2013.01);
(Continued)

(58) Field of Classification Search
CPC .......................... H01M 10/5008; H01M 10/04
(Continued)

(56) References Cited

U.S. PATENT DOCUMENTS 2,793,884 A * 5/1957 Jungblut ............... F16L 15/003
285/231
3,852,117 A * 12/1974 Fraioli .......................... 220/362
(Continued)

FOREIGN PATENT DOCUMENTS

| CN | 101175583 | 5/2008 |
| DE | 10 2010 026 634 A1 | 1/2012 |

(Continued)

OTHER PUBLICATIONS

Machine translation of JP11-213976, Matsuoka, Japan, Aug. 1999.*
(Continued)

*Primary Examiner* — Sarah A Slifka
*Assistant Examiner* — Brent Thomas
(74) *Attorney, Agent, or Firm* — Pearne & Gordon LLP

(57) ABSTRACT

A cell block including a metal case including a plurality of pipe-shaped members and a plurality of single cells housed in each of the pipe-shaped members. Each of the pipe-shaped members is joined at joining surfaces, and the pipe-shaped members are joined and integrated. A member for housing single cells is provided, and the housing member is molded with a high degree of accuracy and is capable of being manufactured at low cost and in a simple manner.

8 Claims, 13 Drawing Sheets

(51) Int. Cl.
H01M 10/617 (2014.01)
H01M 2/10 (2006.01)
B21C 37/14 (2006.01)
H01M 10/6563 (2014.01)
H01M 10/6555 (2014.01)
H01M 10/643 (2014.01)

(52) U.S. Cl.
CPC ......... H01M 10/04 (2013.01); H01M 10/617 (2015.04); H01M 10/643 (2015.04); H01M 10/6555 (2015.04); H01M 10/6563 (2015.04); Y10T 29/49108 (2015.01)

(58) Field of Classification Search
USPC .......................................................... 429/99
See application file for complete search history.

(56) References Cited

U.S. PATENT DOCUMENTS

| | | | |
|---|---|---|---|
| 4,546,056 A | 10/1985 | Jessen et al. | |
| 4,592,972 A | 6/1986 | Juergens | |
| 5,763,116 A | 6/1998 | Lapinski et al. | |
| 5,996,205 A * | 12/1999 | Mashiko | B21C 37/0803 29/463 |
| 2004/0261483 A1 | 12/2004 | Fukuchi et al. | |
| 2006/0113965 A1 | 6/2006 | Jeon | |
| 2008/0121008 A1 | 5/2008 | Yanokura et al. | |
| 2009/0255656 A1 | 10/2009 | Numasawa et al. | |
| 2010/0213703 A1 * | 8/2010 | McCann | B23B 49/02 285/220 |
| 2012/0107663 A1 * | 5/2012 | Burgers et al. | 429/120 |

FOREIGN PATENT DOCUMENTS

| | | |
|---|---|---|
| JP | 60-119084 A | 6/1985 |
| JP | 02-256174 A | 10/1990 |
| JP | 04-284370 A | 10/1992 |
| JP | 08-183122 A | 7/1996 |
| JP | 11-213976 A | 8/1999 |
| JP | 2003-245721 A | 9/2003 |
| JP | 2004-265743 A | 9/2004 |
| JP | 2006-289496 A | 10/2006 |
| JP | 2008-166209 A | 7/2008 |
| JP | 2009-297722 A | 12/2009 |

OTHER PUBLICATIONS

International Search Report for PCT/JP2012/003011 dated Jun. 19, 2012.

Extended European Search Report issued in Application No. 12793711.8 dated Nov. 19, 2013.

* cited by examiner

BATTERY BLOCK AND METHOD OF MANUFACTURING THE SAME

TECHNICAL FIELD

The present invention relates to a battery block and a method of manufacturing the same.

BACKGROUND ART

It is known that a plurality of unit cells are accommodated in one accommodation member to obtain a battery block, and this battery block is used as a high-capacity storage battery. As the accommodation member, an assembly in which cylindrical metallic pipes are spot-welded, an assembly in which a plurality of cases having an accommodation hole are integrally surface-joined, and the like are known (refer to PTL 1).

In addition to this, various related technologies are disclosed (for example, refer to PTLs 2 to 8).

For example, PTL 2 discloses a high-temperature storage battery in which a plurality of storage battery cells are disposed in a predetermined arrangement, and adjacent storage battery cells are partially joined to each other by an external case. PTL 3 also discloses the same invention as PTL 2. However, according to the invention disclosed in PTLs 2 and 3, the storage battery cell is joined to the external case only at several points, and thus it is difficult to suppress local temperature increase by diffusing heat.

In addition, PTL 4 discloses a sodium secondary battery module in which a container main body of an accommodation container assembly is disposed so as to be inserted between thin plates having a semicircular cross section in a lateral direction. However, a joining area between the container main body and the thin plates is small, and thus it is difficult to effectively diffuse heat.

PTL 5 discloses a method of manufacturing a brazing pipe that is used in a header of a heat exchanger, and a method of manufacturing a heat exchanger, but problems in common with the battery block are not mentioned.

CITATION LIST

Patent Literature

PTL 1: Japanese Patent Application Laid-Open No. 2-256174
PTL 2: Japanese Patent Application Laid-Open No. 60-119084
PTL 3: Japanese Patent Application Laid-Open No. 4-284370
PTL 4: Japanese Patent Application Laid-Open No. 2004-265743
PTL 5: Japanese Patent Application Laid-Open No. 2009-297722
PTL 6: U.S. Pat. No. 4,546,056
PTL 7: US Patent Application Laid-Open No. 2009-0255656
PTL 8: U.S. Pat. No. 5,763,116

SUMMARY OF INVENTION

Technical Problem

In a member that accommodates unit cells of a storage battery, high shaping accuracy is required in order to quickly make a temperature distribution of each of the unit cells uniform, or in order to suppress a local temperature increase by diffusing heat in a case where abnormal heat generation (that may occur due to short-circuit inside the unit cell) occurs in the unit cell. In addition, shaping accuracy of a portion in which the unit cell is accommodated is important. When the shaping accuracy of the portion in which the unit cell is accommodated is poor, in a case where a storage battery is installed at a location susceptible to vibration, the accommodated unit cell may vibrate. When the accommodate unit cell vibrates, the unit cell may not exhibit a sufficient cell function, deterioration of the unit cell is advanced, or a cell interconnection is cut. Accordingly, a performance of the storage battery may deteriorate.

In addition, in recent years, high capacity of the storage battery has been strongly requested. It is necessary to accommodate many unit cells in the accommodation member so as to realize high capacity of the storage battery. To accommodate relatively many unit cells for a unit volume, it is necessary to reduce an interval between unit cells. It is necessary for the accommodation member to be relatively thin so as to reduce the interval between the unit cells. When the accommodation member is made to be thin, there is a tendency for the shaping accuracy of the accommodation member to decrease.

Therefore, an object of the invention is to provide a member accommodating a plurality of unit cells, which has high shaping accuracy.

Solution to Problem

A first aspect of the invention relates to a battery block described below.

[1] A battery block, including:
a metallic case that includes a plurality of pipe-shaped members; and
a plurality of unit cells that are accommodated in the pipe-shaped members, respectively,
wherein the pipe-shaped members are joined at mating faces, respectively, and
the plurality of pipe-shaped members are joined to each other and are integrated with each other.

[2] The battery block according to [1],
wherein the joining of the pipe-shaped members at the mating faces and the joining between the pipe-shaped members are realized by brazed joints.

[3] The battery block according to [1] or [2],
wherein the pipe-shaped member is a member that is obtained by bending a metallic plate including a core material and a brazing material layer into a pipe shape, and performing brazing at the mating faces.

[4] The battery block according to [1],
wherein the pipe-shaped member is a member that is obtained by bending a metallic plate into a pipe shape, and performing bonding with an adhesive, metal welding, or diffusion joining at the mating faces.

[5] The battery block according to any one of [1] to [4],
wherein the pipe-shaped member is formed from aluminum, copper, brass, or stainless steel.

[6] The battery block according to any one of [1] to [5],
wherein the pipe-shaped member is a circular pipe or a polygonal pipe.

[7] The battery block according to any one of [1] to [6],
wherein the pipe-shaped member has a penetration slot or a notch portion.

[8] The battery block according to [1],
wherein a gap between the mating faces is 0.05 to 0.2 mm.

[9] The battery block according to [1], wherein the pipe-shaped member has a protrusion at the mating faces, the protrusion protruding into a hollow of the pipe-shaped member.

A second aspect of the invention relates to a method of manufacturing a battery block, which is described below.

[10] A method of manufacturing a battery block, the method including:

a step of obtaining a plurality of pipe-shaped metallic plates having a brazing material layer on an outer circumferential surface by bending a metallic plate including a core material and the brazing material layer to constitute mating faces;

a step of obtaining an assembly of the pipe-shaped metallic plates by bringing the plurality of pipe-shaped metallic plates into contact with each other and fixing the plates to each other; and a step of obtaining a battery case by heating the assembly of the pipe-shaped metallic plates, brazing the mating faces of each of the pipe-shaped metallic plates to form a pipe-shaped member, and brazing the pipe-shaped metallic plates with each other.

[11] A method of manufacturing a battery block, the method including:

a step of obtaining a plurality of pipe-shaped metallic plates by bending a metallic plate to constitute mating faces;

a step of obtaining an assembly of the pipe-shaped metallic plates by bringing the plurality of pipe-shaped metallic plates into contact with each other and fixing the plates to each other;

a step of disposing a brazing material on an outer circumferential surface of the assembly; and a step of obtaining a battery case by heating the assembly on which the brazing material is disposed, brazing the mating faces of each of the pipe-shaped metallic plates to form a pipe-shaped member, and brazing the pipe-shaped metallic plates with each other.

[12] The method of manufacturing the battery block according to [10] or [11], further including:

a step of accommodating a unit cell in a hollow portion of the pipe-shaped member of the battery ease.

Advantageous Effects of Invention

According to the battery block of the invention, since shaping accuracy of a metallic case, which is an accommodation container of a unit cell, is high, a temperature distribution of the unit cell quickly becomes uniform, and in a case where abnormal heat generation occurs in the unit cell, a local temperature increase is suppressed by diffusing heat. In addition, since shaping accuracy of a portion in which the unit cell is accommodated is high, vibration of the accommodated unit cell is suppressed. Accordingly, a performance as a storage battery does not deteriorate. As a result, even in a case of a storage battery that is used under a circumstance that is susceptible to vibration, an effective battery block is provided. For example, the storage battery, which is used under a circumstance susceptible to vibration, is for a vehicle.

DESCRIPTION OF EMBODIMENTS

A battery block of the invention includes a metallic case and a plurality of unit cells. The metallic case includes a plurality of pipe-shaped members, and each of the unit cells is accommodated in a hollow portion of each of the pipe-shaped members. The unit cell that is included in the battery block has an electricity storage performance. Therefore, it is preferable that the battery block function as a high-capacity storage battery.

Battery Block

Figures 1A, 1B:
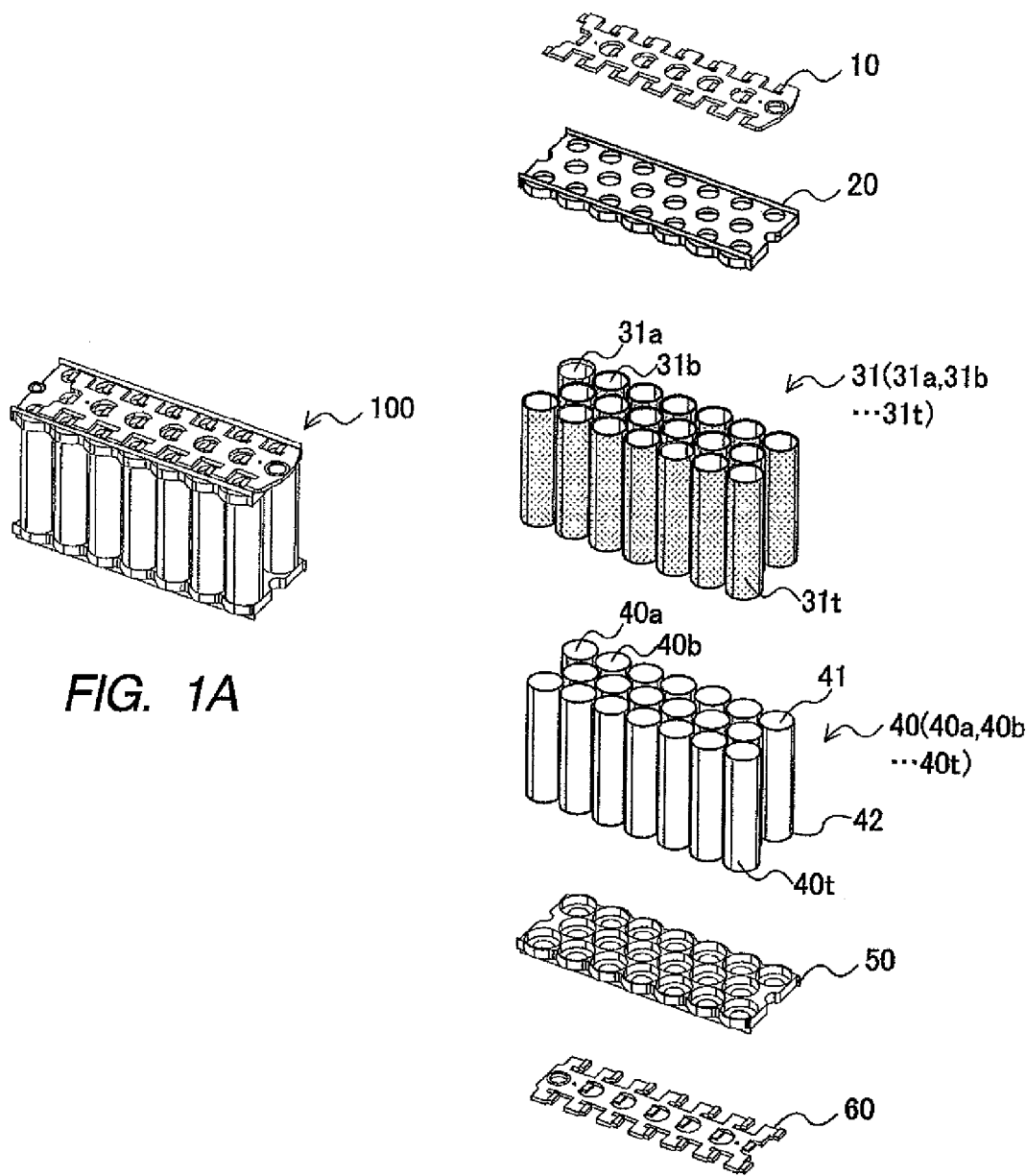
FIG. 1A is a perspective diagram of a battery block of the invention.
FIG. 1B is an exploded perspective diagram of the battery block of the invention.

In FIGS. 1A and 1B, summery of an example of the battery block of the invention is shown. FIG. 1A shows a perspective diagram of battery block 100 of the invention. FIG. 1B shows an exploded perspective diagram of battery block 100. As shown in FIG. 1B, battery block 100 includes electrode plate 10, holder 20, assembly 31 of pipe-shaped members 31a, 31b, . . . , 31t, a plurality of unit cells 40 (40a, 40b, . . . , 40t), holder 50, and electrode plate 60.

Unit cells 40a, 40b, . . . , 40t are accommodated in corresponding pipe-shaped members 31a, 31b, . . . , 31t, respectively. Unit cells 40 that are accommodated are supported by holders 20 and 50. One electrode 41 of each of unit cells is connected to electrode plate 10 and the other electrode 42 is connected to electrode plate 60.

As shown in FIG. 1B, unit cells 40a, 40b, . . . , 40t are accommodated in corresponding pipe-shaped members 31a, 31b, . . . , 31t, respectively. Assembly 31 including the plurality of pipe-shaped members constitutes a metallic case of the battery block of the invention. It is preferable that pipe-shaped members 31a, 31b, . . . , 31t be fixed in a state of being brought into contact with each other and be integrated with each other.

It is preferable that the plurality of pipe-shaped members 31a, 31b, . . . , 31t, which constitute the metallic case, be joined to each other and be integrated to form an assembly. More specifically, respective side surfaces of the plurality of pipe-shaped members 31a, 31b, . . . , 31t are joined to each other to be integrated. Assembly 31 of the pipe-shaped members that is included in one battery case may be constructed by two or more pipe-shaped members, and the upper limit is not particularly limited. In addition, the metallic case may further include frame body 400 surrounding assembly 31 of the pipe-shaped members (refer to FIG. 9A to be described later).

Figure 2A:
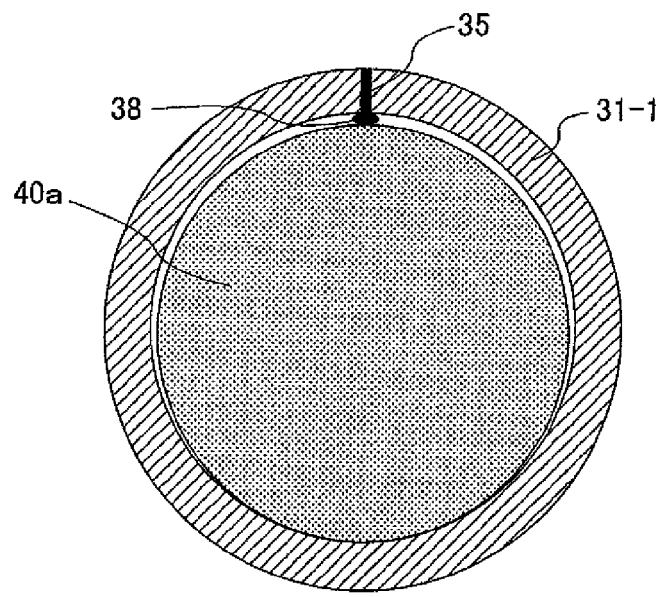
FIGS. 2A and 2B are diagrams illustrating an example of a shape of a pipe-shaped member.
Figure 2B:
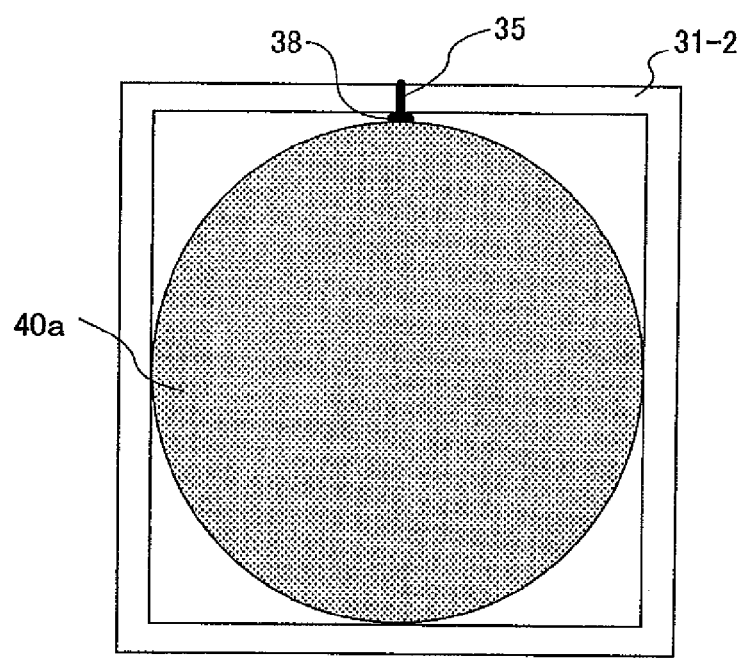

Pipe-shaped member 31 may be, for example, circular pipe 31-1 as shown in FIG. 2A, or polygonal pipe 31-2 such as a tetragon as shown in FIG. 2B. The inside of each of pipe-shaped members 31a, 31b, . . . , 31t is constructed by a cavity along an axial direction of a pipe. In each of pipe-shaped members 31a, 31b, . . . , 31t, each of unit cells 40a, 40b, . . . , 40t is accommodated. Commonly, each of unit cells 40a, 40b, . . . , 40t has a cylindrical shape.

Figure 3A:
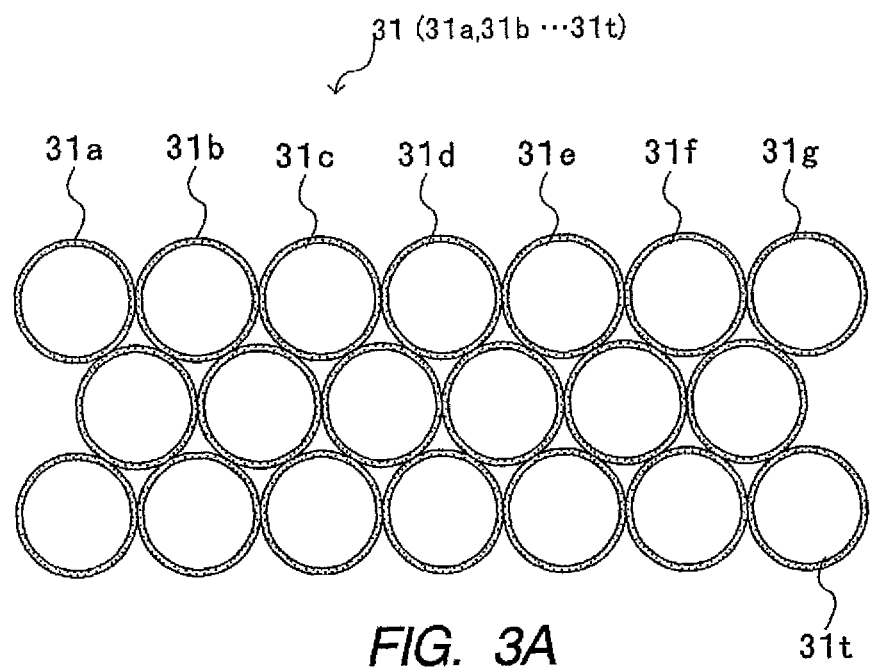
FIGS. 3A and 3B are diagrams illustrating an arrangement state of the pipe-shaped member.
Figure 3B:
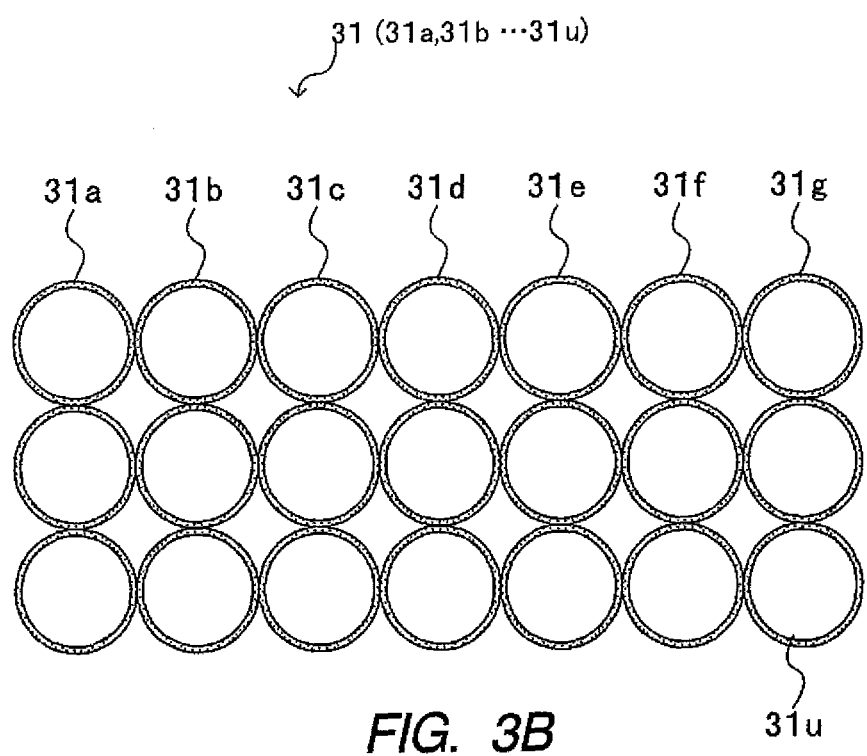

It is preferable that the plurality of pipe-shaped members 31a, 31b, . . . , 31t be integrated in such a manner that these come into contact with each other. An arrangement aspect of pipe-shaped members 31a, 31b, . . . , 31t is not particularly limited. For example, in a case where respective pipe-shaped members 31a, 31b, . . . , 31t are circular pipes, as shown in FIG. 3A, the circular pipes may be arranged in a close packing manner. In addition, as shown in FIG. 3B, respective pipe-shaped members 31a, 31b, . . . , 31u may be squarely arranged. In FIGS. 3A and 3B, mating faces 35 are not shown.

It is preferable that pipe-shaped member 31 be formed from a metal. It is preferable that a constituent metal of pipe-shaped member 31 be a metal having high heat conductivity. Specific examples include aluminum, copper, brass, stainless steel, an alloy thereof, and the like. Aluminum is preferable for realizing lightness of the pipe-shaped member.

It is preferable that the thickness of the plate constituting pipe-shaped member 31 be 0.2 to 0.8 mm, and for example, approximately 0.4 mm. The smaller the thickness is, the further the metallic case becomes light. Accordingly, this is preferable. However, when the thickness is too small, the strength that is necessary for the case may not be obtained.

A hollow size of pipe-shaped member 31 is set in accordance with the size of unit cell 40 that is accommodated therein. That is, it is preferable that a diameter of a hollow cross-section be slightly larger than a diameter of a cross-section of unit cell 40 that is accommodated in the hollow. This is because it is necessary to accommodate the unit cell in a hollow portion. It is preferable that a difference (clearance) between the diameter of the hollow cross-section of pipe-shaped member 31 and the diameter of the cross-section of unit cell 40 (including an insulating sheet in a case of covering the unit cell with the insulation sheet) that is accommodated therein be 0.01 to 0.38 mm. When the clearance is too large, the unit cell that is accommodated vibrates, and thus this is not preferable. When the clearance is too small, the unit cell may not be accommodated.

Figure 4A:
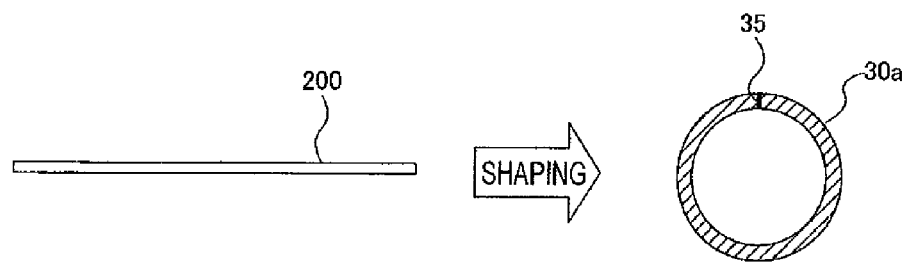
FIG. 4A is a diagram illustrating mating faces of the pipe-shaped member.

As shown in FIGS. 2A and 2B, pipe-shaped member 31 has mating faces 35, and is joined at the mating faces. "Mating faces 35" represents mating faces 35 to be joined when one sheet of metal flat plate 200, for example, as shown in FIG. 4A is bent into a pipe shape. In addition, "Mating faces 35" represents mating faces 35 to be joined when two half-pipe-shaped metal plates 300, for example, as shown in FIG. 4B are joined into a pipe shape.

Figure 4B:
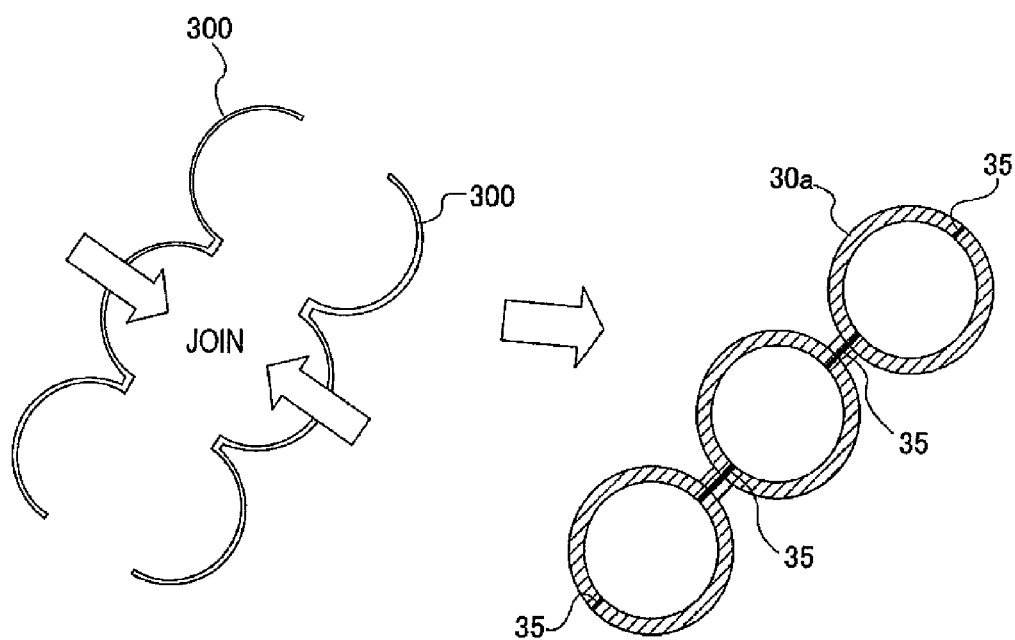
FIG. 4B is a diagram illustrating the mating faces of the pipe-shaped member.

As described above, pipe-shaped member 31 may be obtained by bending a metallic flat plate and joining the mating faces (refer to FIG. 4A), or by joining half-pipe-shaped members (refer to FIG. 4B). Examples of joining means at mating faces 35 include brazing, bonding with an adhesive, metal welding, diffusion joining, and the like, and among these, brazing is preferable. According to the brazing, the mating faces may be joined by the same process as a joining process (described later) between pipe members.

Relationship Between Joining Method and Protrusion

As shown in FIGS. 2A and 2B, each of pipe-shaped members 31 (31-1 and 31-2) may have protrusion 38 that is formed on a hollow inner surface of the pipe at mating faces 35. Although not particularly limited, it is preferable that protrusion 38 be a protrusion generated due to joining at mating faces 35. Hereinafter, a relationship between the joining method and protrusion 38 will be described with reference to FIGS. 5A to 5D.

1) Case of Joining by Brazing

Figure 5A:
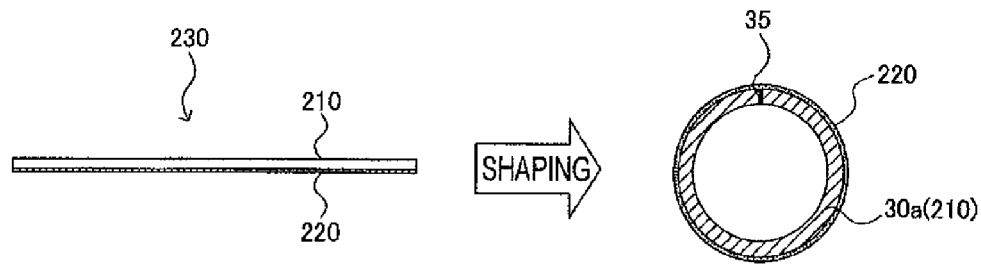
FIGS. 5A, 5B, and 5C are diagrams illustrating a method of obtaining a pipe-shaped member in which a brazing material is disposed on an outer circumferential surface thereof.
Figure 5B:
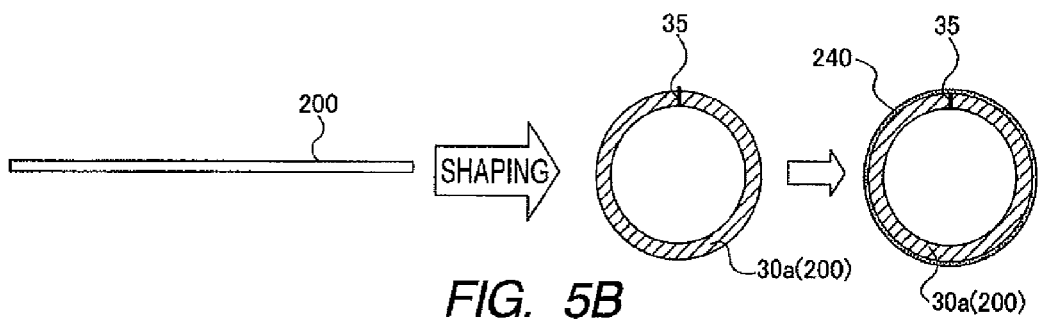
Figure 5C:
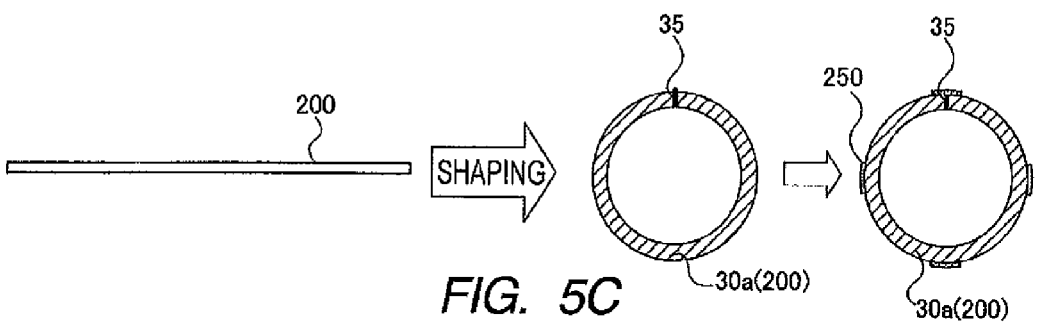
Figure 5D:
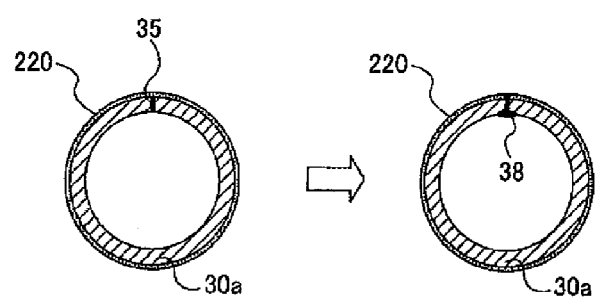
FIG. 5D is a diagram illustrating a protrusion that is formed by junction at the mating faces.

Pipe-shaped member 31 may be obtained by disposing a brazing material on an outer circumferential surface of non-joined pipe-shaped member (pipe-shaped metallic plate) 30a having mating faces 35, and heating the brazing material to braze pipe-shaped member 30a. For example, non-joined pipe-shaped member 30a in which the brazing material is disposed on the outer circumferential surface thereof may be manufactured by the following methods a), b), or c). The "brazing material" represents an alloy having a melting point lower than that of a metal constituting a core material.

a) As shown in FIG. 5A, metal plate 230 including core material 210 and brazing material layer 220 may be bent into a pipe shape.

b) As shown in FIG. 5B, metal flat plate 200 may be bent into a pipe shape, and then brazing sheet (thin brazing material) 240 may be wound around the resultant pipe-shaped member.

c) As shown in FIG. 5C, metal flat plate 200 may be bent into a pipe shape, and then brazing paste (brazing paste) 250 may be applied to the resultant pipe-shaped member.

In this manner, non-joined pipe-shaped member (pipe-shaped metallic plate) 30a in which the brazing material is disposed on the outer circumferential surface thereof is prepared. In addition, a method of manufacturing non-joined pipe-shaped member (pipe-shaped metallic plate) 30a is not particularly limited to the above-described method.

At mating faces 35 of pipe-shaped metallic plate 30a having mating faces 35, it is preferable that ends of pipe-shaped metallic plate 30a in a lateral direction do not come into completely contact with each other, and a gap be provided between mating faces 35. In addition, pipe-shaped metallic plate 30a in which the brazing material is disposed on the outer circumferential surface thereof is heated to braze the mating faces. The brazing is performed by heating the pipe to a temperature higher than the melting point of the brazing material. In the brazing process, it is preferable that the brazing material flow into the gap between the mating faces, and the brazing material further leak to a hollow inner to form a protrusion. In this manner, the joining at mating faces 35, and formation of protrusion 38 that is formed from the remainder of the brazing material may be performed (refer to FIG. 5D).

Figure 6A:
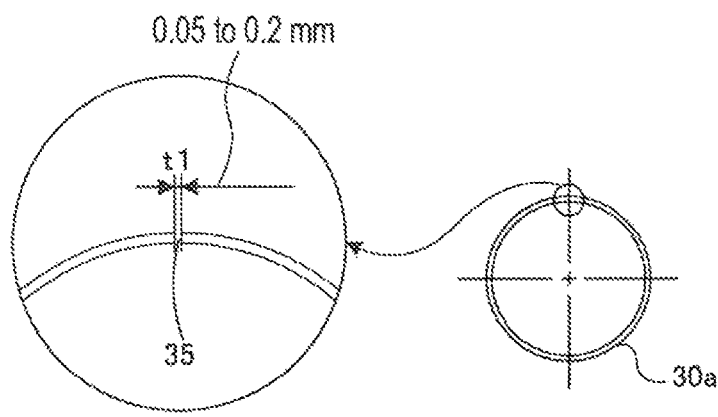
FIG. 6A is a diagram illustrating a gap between mating faces of the pipe-shaped member.

As shown in FIG. 6A, it is preferable that interval t1 of the gap between mating faces 35 of pipe-shaped metallic plate 30a be 0.05 to 0.2 mm. This is because the brazing material easily intrudes into the gap with a capillary phenomenon. When the gap is too narrow, it is difficult for the brazing material to flow into the gap, and thus the protrusion may not be formed. On the other hand, when the gap is too broad, the capillary phenomenon does not occur, and thus the brazing may not performed.

Figure 6B:
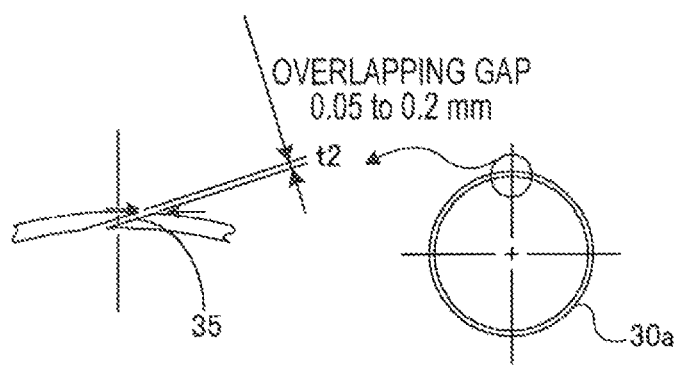
FIG. 6B is a diagram illustrating the gap between the mating faces of the pipe-shaped member.

In addition, a shape of the gap between mating faces 35 may be adjusted to allow the brazing material to easily flow into the gap so as to reliably form the protrusion. For example, as shown in FIG. 6B, mating faces 35 may be formed to be inclined with respect to a main surface of pipe-shaped metallic plate 30a. In this case, it is preferable that an interval t2 of the gap of pipe-shaped metallic plate 30a be 0.05 to 0.2 mm. This is due to the same reason as FIG. 6A.

Figure 6C:
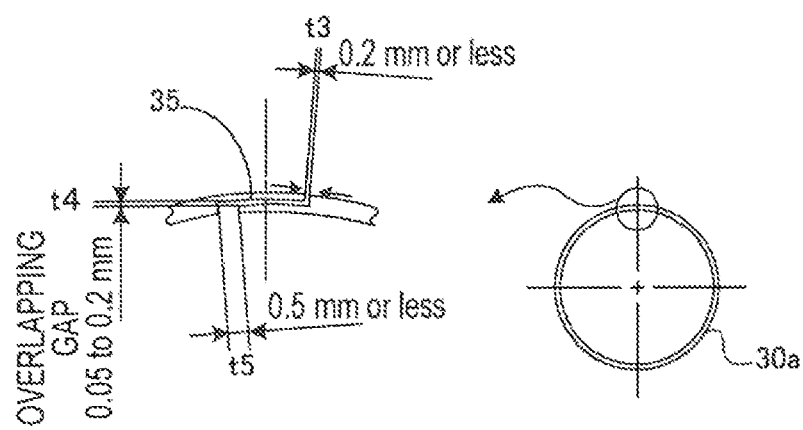
FIG. 6C is a diagram illustrating the gap between the mating faces of the pipe-shaped member.

In addition, as shown in FIG. 6C, each of mating faces 35 may be formed in a multi-step. This is because when the shape of the gap between mating faces 35 is adjusted, the brazing material easily flows into the gap, and thus an appropriate protrusion is formed. In this case, it is preferable that interval t3 of the gap be 0.2 mm or less. In addition, it is preferable interval t4 of the gap be 0.05 to 0.2 mm. In addition, it is preferable that interval t5 of the gap be 0.5 mm or less.

2) Case of Joining by Adhesive

Pipe-shaped member 31 may be obtained by applying an adhesive to mating faces 35 of pipe-shaped metallic plate 30a having mating faces 35 to bond mating faces 35 with each other. In this bonding, the applied adhesive leaks to the hollow inner surface to form a protrusion. That is, a protrusion formed from the remainder of the adhesive is formed.

3) Case of Joining by Welding

Pipe-shaped member 31 may be obtained by metal-welding mating faces 35 of pipe-shaped metallic plate 30a having mating faces 35. Means for the metal welding is not particularly limited, and TIG welding, laser welding, or the like may be exemplified. In a ease of performing the metal welding, it is preferable to bring mating faces 35 of the metallic plate into close contact with each other. When mating faces 35, which are brought into close contact with each other, are welded by metal melting, a protrusion called "welding protrusion" may be formed. When this welding protrusion is positively formed, a protrusion protruding into the hollow is formed.

4) Case of Joining by Diffusion Joining

Pipe-shaped member 31 may be obtained by diffusion-joining mating faces 35 of pipe-shaped metallic plate 30 having mating faces 35. The diffusion joining is performed by pressing and heating metal plates that overlap each other at mating faces 35. When the metal plates are pressed, a protrusion may be pressure-molded at the mating faces.

It is preferable that the height of protrusion 38 (refer to FIGS. 2A and 2B) at the mating faces of pipe-shaped member 31 be set in accordance with a difference (clearance) between the diameter of the hollow cross-section of pipe-shaped member 31 and the diameter of the cross-section of the unit cell (including an insulating sheet in a case of covering the unit cell with the insulation sheet) that is accommodated therein. The height may be set to be larger than the clearance. The height of protrusion 38 as a reference may be equal to or more than "the sum of the clearance and ⅕ of the thickness of the insulation sheet that covers the unit cell", and may be equal to or less than "the sum of the clearance and ⅓ of the thickness of the insulation sheet that covers the unit cell." Protrusion 38 suppresses vibration or rotation of the unit cell accommodated in the hollow portion of pipe-shaped member 31.

Figure 7A:
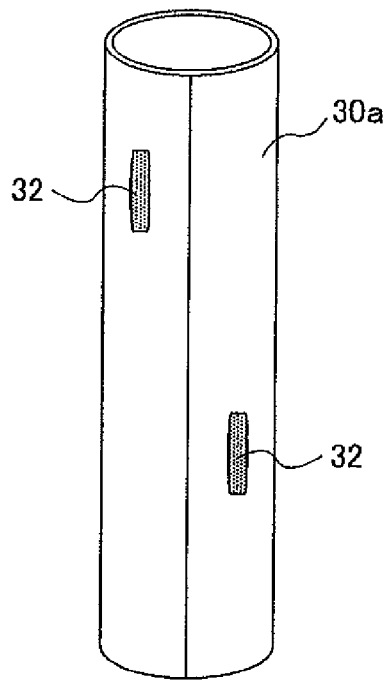
FIG. 7A is a diagram illustrating a pipe-shaped member having a penetration slot.
Figure 7B:
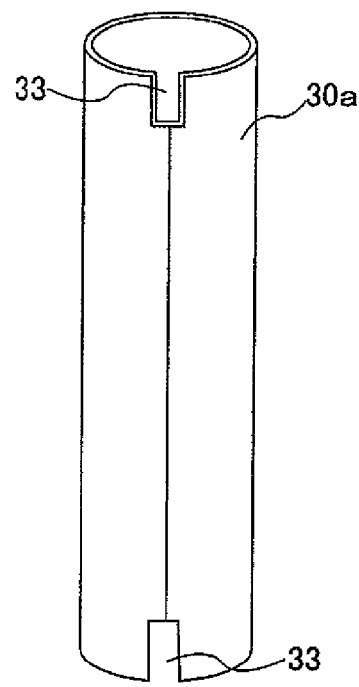
FIG. 7B is a diagram illustrating a pipe-shaped member having a notch.

As shown in FIG. 7A, penetration slot 32 may be provided in a part of the side surface of pipe-shaped metallic plate 30a. As shown in FIG. 7B, notch 33 may be provided at each of both ends in a longitudinal direction. This is because an external member (a temperature sensor or the like) may be connected to the unit cell (not shown) through penetration slot 32 or notch 33, the unit cell being accommodated in the inside.

As described above, the metallic case constituting the battery block includes the plurality of pipe-shaped members. The plurality of pipe-shaped members come into contact with each other and are integrated with each other. Specifically, the respective pipe-shaped members are joined to each other at a side surface of the respective pipe-shaped member and are integrated with each other.

The joining between the pipe-shaped members is performed by brazing, bonding with an adhesive, metal welding, or the like, but the joining is preferably performed by brazing. For example, a plurality of pipe-shaped metallic plates, in which a brazing material is disposed on an outer circumferential surface thereof, are brought into contact with each other and are temporarily fixed to form an assembly, and the resultant assembly is heated to join the pipe-shaped members (pipe-shaped metallic plates) to each other.

Each of the pipe-shaped members that are to be temporarily fixed to form the assembly may be a member after the joining at mating faces 35 or a member before the joining. In a case of temporarily fixing the plurality of pipe-shaped members (pipe-shaped metallic plates) having mating faces 35 before the joining to form the assembly, the joining at mating faces 35 and the joining between pipe-shaped metallic plates 30 that become pipe-shaped members 31 may be performed in the same process, and thus this case is preferable.

Figure 8A:
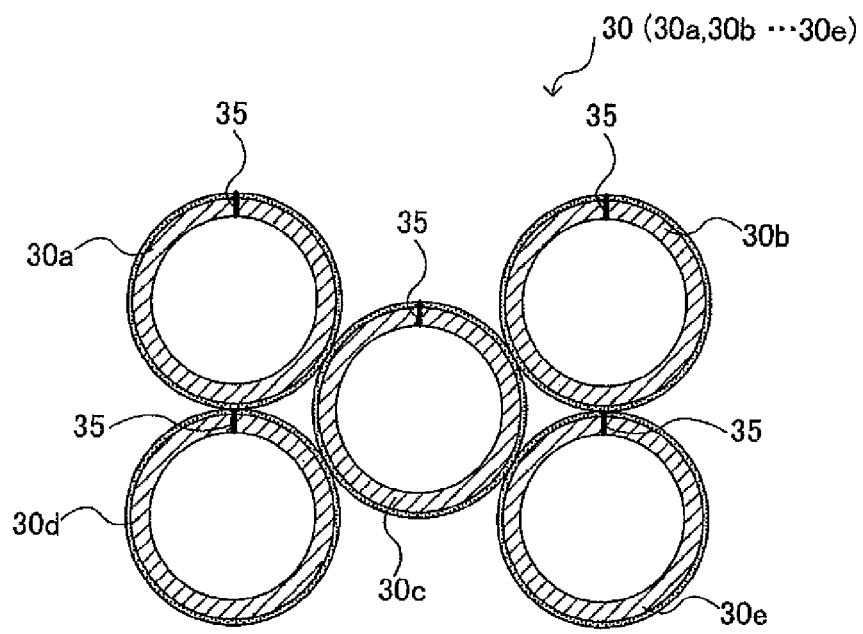
FIGS. 8A and 8B are diagrams illustrating a position of mating faces in a plurality of pipe-shaped members constituting a metallic case.
Figure 8B:
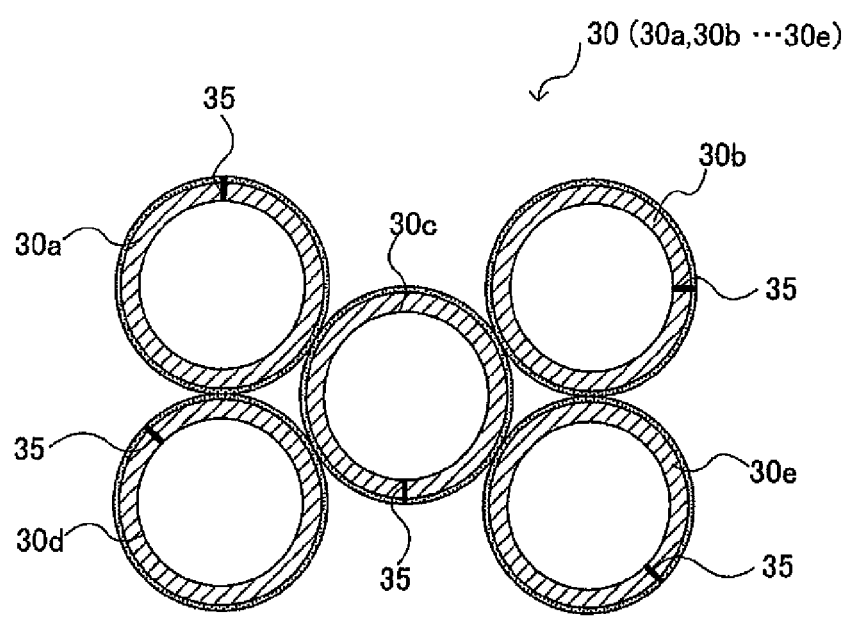

As shown in FIG. 8A, mating faces 35 of pipe-shaped metallic plates 30 (30a, 30b, . . . , 30e) that become the plurality of pipe-shaped members may be regularly arranged in the same direction, or may be randomly disposed as shown in FIG. 8B. In FIG. 8A, mating faces 35 are disposed on an upper side in the drawing. When mating faces 35 are disposed in the same direction, for example, an effect in which the brazing material easily flows into the gap between mating faces 35 may be obtained.

Figure 9A:
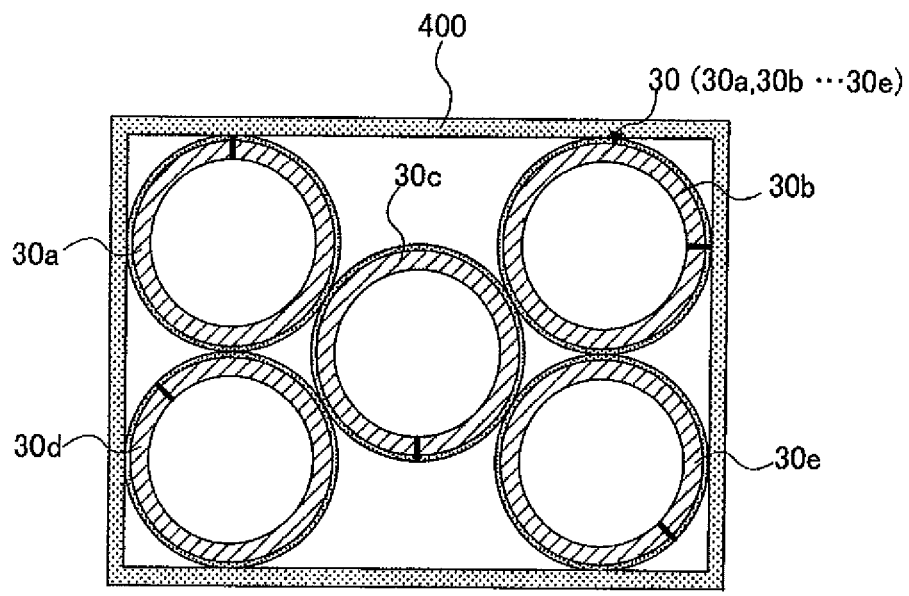
FIG. 9A is a diagram illustrating a state in which an assembly of the plurality of pipe-shaped members is temporarily fixed by a frame body.

When pipe-shaped metallic plates 30 (30a, 30b, . . . , 30e) are intended to be temporarily fixed, as shown in FIG. 9A, an assembly may be fixed with frame body 400 as a jig. The brazing material may be disposed on an inner surface of frame body 400 or may not be disposed. Frame body 400 as the jig may be detached after joining the pipe-shaped members, or may be used as one member of the metallic case of the battery block.

Figure 9B:
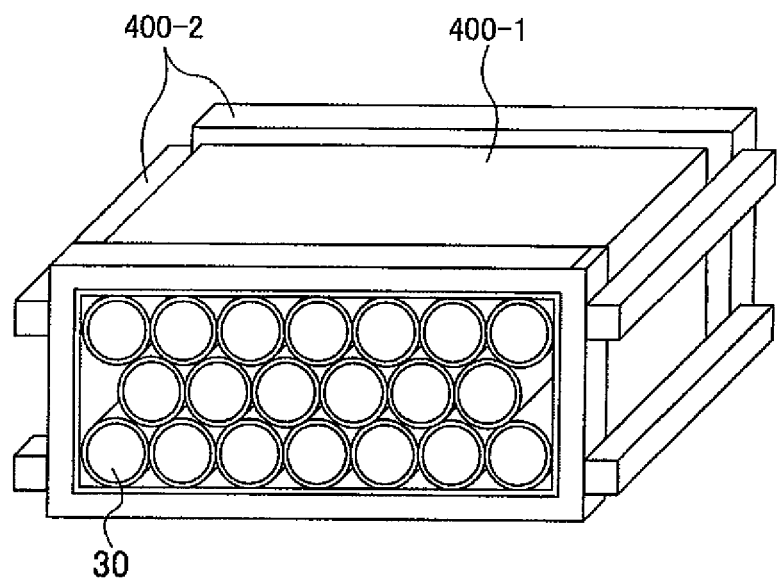
FIG. 9B is a diagram illustrating a state in which the assembly of the plurality of pipe-shaped members is temporarily fixed by the frame body.

Frame body 400 is used as a jig during the brazing between the pipe-shaped members. Therefore, it may be preferable that a coefficient of linear expansion of frame body 400 be the same as that of the pipe-shaped members. This is in order for an assembly of the pipe-shaped members to be reliably maintained by the frame body during the heating of the brazed joints and in order for stress not to be applied to pipe-shaped metallic plates 30 (30a, 30b, ..., 30e). Therefore, for example, as shown in FIG. 9B, the coefficient of linear expansion of the frame body is adjusted by using a frame body obtained by assembling stainless steel plate 400-1 and aluminum frame 400-2. Stainless steel plate 400-1 prevents pipe-shaped member 30 and aluminum frame 400-2 from joining to each other.

Figure 10A:
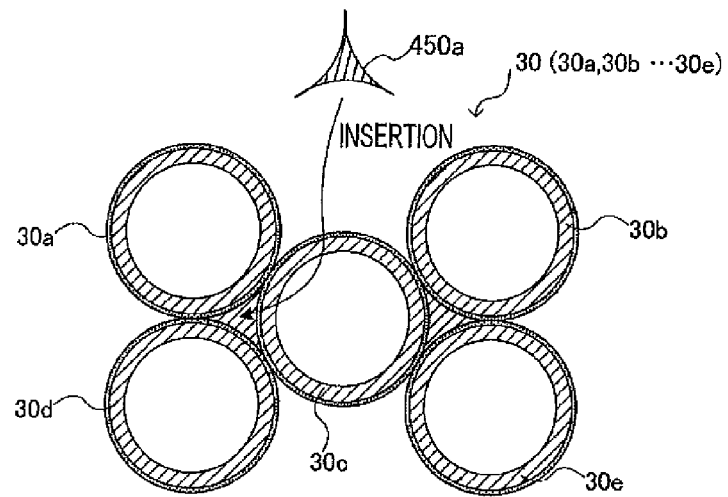
FIGS. 10A, 10B, and 10C are diagrams illustrating a metallic case including the plurality of pipe-shaped members and a metallic member inserted in a gap between the pipe-shaped members.
Figure 10B:
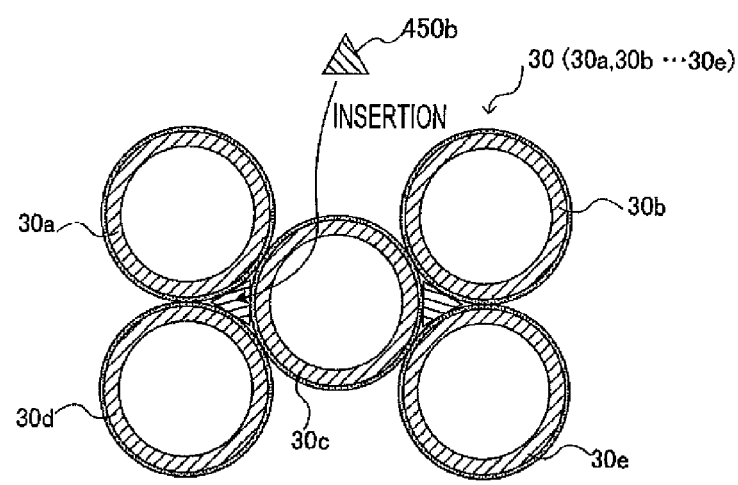
Figure 10C:
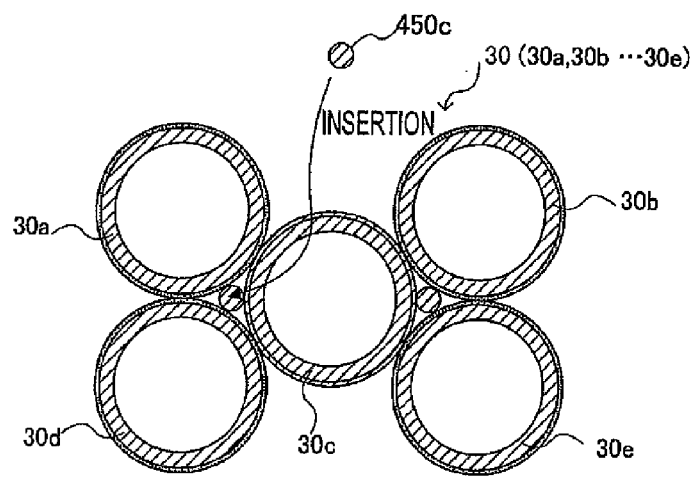

As shown in FIGS. 10A to 10C, in addition to the plurality of the pipe-shaped members, the assembly may also include metallic member 450 (450a, 450b, or 450c) that is inserted in the gap between the pipe-shaped members. This is because, when metallic member 450 inserted in the gap is provided, thermal capacity of the metallic case may be increased. Specifically, as shown in FIG. 10A, the gap may be completely filled with inserting metallic member 450a in the gap. In addition, when the thermal capacity of the metallic case can be increased, the gap may not be completely filled. For example, the gap may not be completely filled with inserting metallic member 450b having a triangular prism shape in the gap as shown in FIG. 10B or with inserting columnar metallic member 450c in the gap as shown in FIG. 10C.

Figure 11:
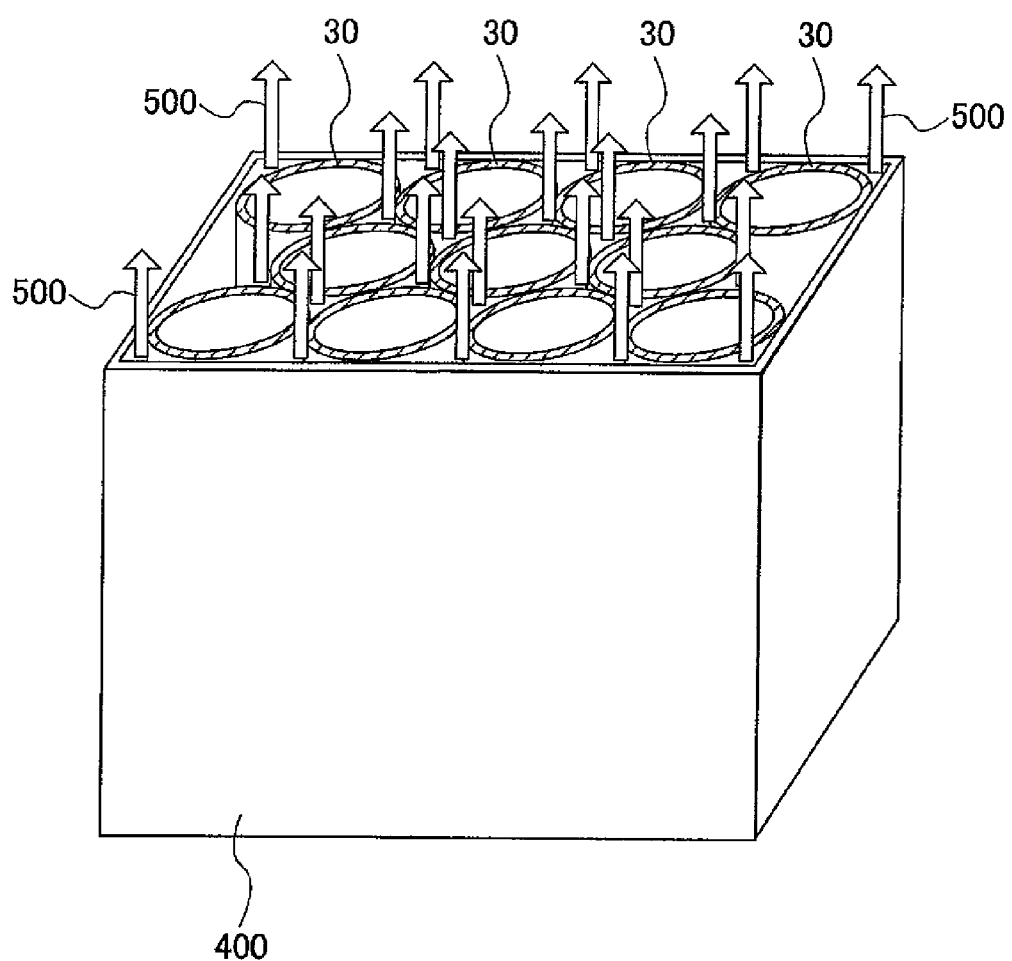
FIG. 11 is a diagram illustrating flowing of a coolant through the gap between the pipe-shaped members in the metallic case.

On the other hand, the gap between the pipe-shaped members in the assembly may be left as is in a hollow state. This is because it is easy to heat or cool the battery block by allowing a coolant to flow through the gap or disposing a heater therein. For example, as shown in FIG. 11, coolant gas 500 may be allowed to flow through the gap.

After the metallic case is obtained by heating assembly 30 of pipe-shaped metallic plates 30a, 30b, ... to be brazed to each other, the unit cell is accommodated in each pipe-shaped member 31, and other members necessary for a battery are added thereto, whereby the battery block is obtained. The unit cell is commonly covered with a metallic case, but may be further covered with an insulation sheet. The insulation sheet is commonly a resin film, and the thickness thereof is 45 to 75 μm.

Method of Manufacturing Battery Block

Hereinafter, as an example, a method of manufacturing the battery block (metallic case) of the invention will be described with reference to FIGS. 12A to 12D, and FIG. 13.

Figure 12A:
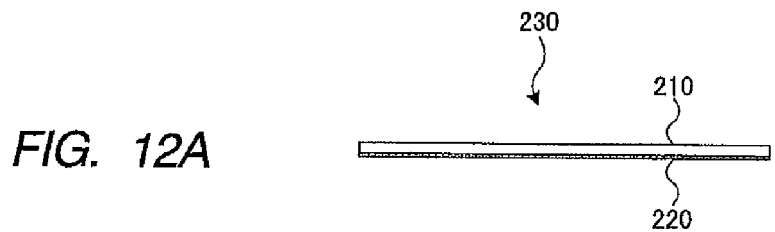
FIGS. 12A, 12B, 12C, and 12D are diagrams illustrating an example of a manufacturing flow of the metallic case of the battery block of the invention.
Figure 12B:
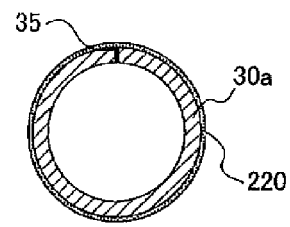

(a) First, metallic plate 230 (refer to FIG. 12A) including core material 210 and brazing material layer 220 as shown in FIG. 12A is prepared. Then, metallic plate 230 is bent to constitute mating. faces 35 to obtain pipe-shaped metallic plate 30a in which brazing material layer 220 is arranged on an outer circumferential surface of core material 210 as shown in FIG. 12B. This process is repetitively performed to obtain a plurality of pipe-shaped metallic plates 30a, 30b, ..., 30e.

Figure 12C:
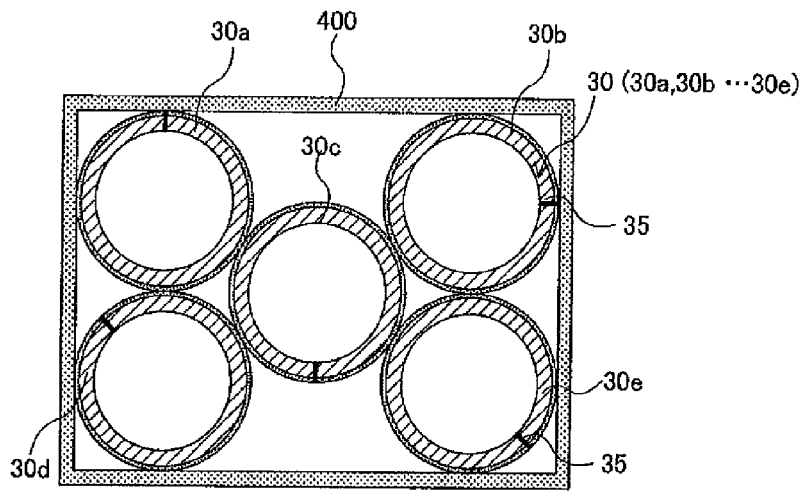

(b) The plurality of pipe-shaped metallic plates 30a, 30b, ..., 30e are brought into contact with each other and are fixed to obtain assembly 30 of pipe-shaped metallic plates 30a, 30b, ..., 30e. Specifically, pipe-shaped metallic plates 30a, 30b, ..., 30e are brought into contact with each other and are temporarily fixed to obtain assembly 30. Then, as shown in FIG. 12C, assembly 30 is fixed with frame body 400.

Figure 12D:
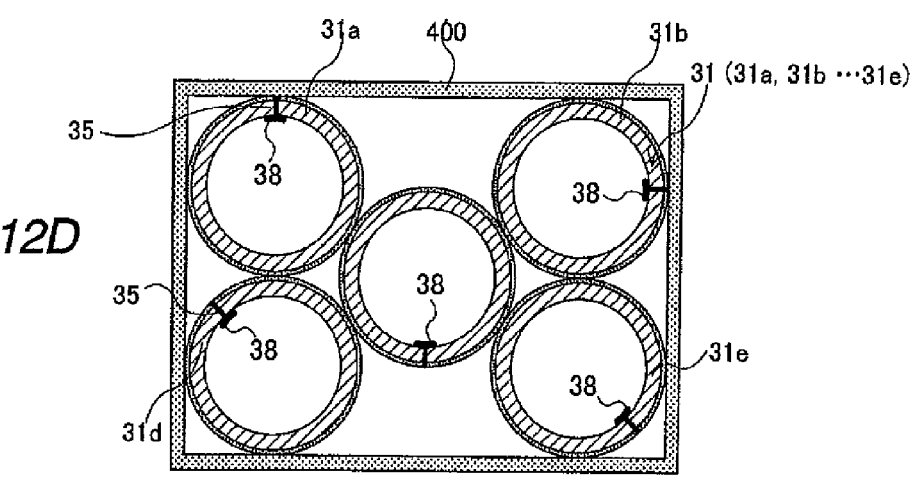

(c) Assembly 30 of the pipe-shaped metallic plates is heated. Mating surfaces 35 of pipe-shaped metallic plates 30a, 30b, ..., 30e are brazed to obtain assembly 31 of pipe-shaped members 31a, 31b, ..., 31e. In addition, pipe-shaped metallic plates 30a, 30b, ..., 30e are brazed to each other. According to this process, protrusion 38 formed from the brazing material as shown in FIG. 12D is formed. In this manner, the metallic case may be obtained.

Figure 13:
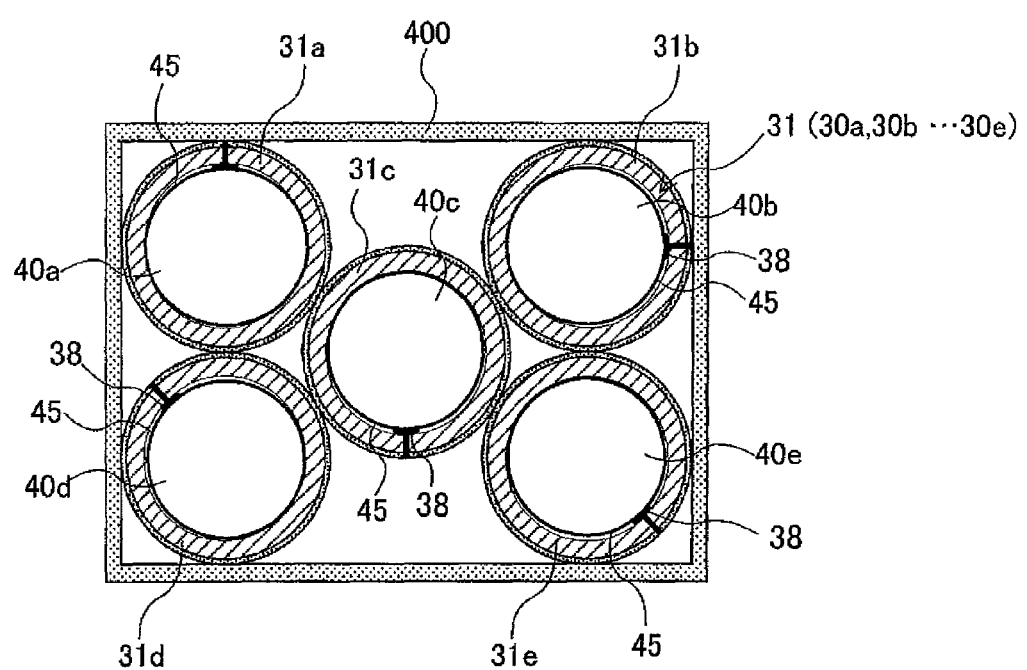
FIG. 13 is a diagram illustrating a state in which a plurality of unit cells are accommodated in the metallic case.

(d) Furthermore, as shown in FIG. 13, unit cells 40a, 40b, ..., 40e are accommodated in the plurality of pipe-shaped members 31a, 31b, ..., 31e of the metallic case of FIG. 12D, respectively. Then, members necessary for a battery are added.

In this manner, a battery block is manufactured. In addition, unit cell 40 may be provided with insulation sheet 45 that covers the unit cell.

Hereinbefore, the method of manufacturing the battery block was described, but the method of manufacturing the battery block is not limited to the above-described manufacturing method. For example, instead of the above-described process (a), as shown in FIG. 5B, metallic plate 200 is bent to constitute mating faces 35, thereby obtaining pipe-shaped metallic plate 30a. In this case, it is preferable to dispose the brazing material on the outer circumferential surface of the assembly before proceeding to the (c) process after the above-described process (b).

Next, an operation effect of the method of manufacturing the battery block related to the invention will be described in comparison with a method of manufacturing a battery block in the related art.

In the related art, when the pipe-shaped member is formed from a cast metal, since a raw material of a mold is sand, surface accuracy of the mold is poor, and surface accuracy of a pipe-shaped member that is a transcript of the mold also decreases. In addition, in a case of obtaining an aluminum pipe-shaped member, due to a variation in components of an aluminum molten metal or the like, a cavity may occur. Therefore, in addition to necessity of a secondary processing to increase the surface accuracy, it is difficult to remove the occurred cavity. In addition, it may be considered that the pipe-shaped member is obtained by a drawing processing. However, when it is intended to decrease the thickness of the pipe-shaped member, shaping accuracy may decrease, and shaping itself is difficult.

Conversely, according to the method of manufacturing the battery block related to the invention, since the metallic plate is bent to obtain the pipe-shaped member, it is possible to simply increase shaping accuracy of a portion of the battery block, in which the unit cell is accommodated. Accordingly, in the battery block that is obtained by the method of manufacturing the battery block of the invention, since vibration of the unit cell that is accommodated may be suppressed, it is difficult for a performance as a battery block storage battery to deteriorate. In addition, this battery block is light and compact. Examples of use of the battery block utilizing this characteristic include a storage battery mounted in a vehicle.

The disclosure of Japanese Patent Application No. 2011-120473, filed on May 30, 2011, including the specification, drawings and abstract, is incorporated herein by reference in its entirety.

INDUSTRIAL APPLICABILITY

The battery block of the invention includes a plurality of unit cells and a metallic case that accommodates the unit cells, and shaping accuracy of the metallic case is high. Therefore, vibration of the unit cells that are accommodated is suppressed, and a function of each of the unit cells is appropriately exhibited. Furthermore, the metallic case may be simply manufactured at a lower cost.

REFERENCE SIGNS LIST

10 Electrode plate
20 Holder

30 Pipe-shaped metallic plate
31: Pipe-shaped member
30-1 Circular pipe
30-2 Polygonal pipe
32 Penetration slot
33 Notch
35 Mating face
38 Protrusion
40 Unit cell
41 Electrode
42 Electrode
45 Insulation sheet covering unit cell
50 Holder
60 Electrode plate
100 Battery block
200 Metallic flat plate
210 Core material
220 Brazing material layer
230 Metallic plate
240 Brazing sheet
250 Brazing paste
300 Half-pipe-shaped metallic plate
400 Frame body
400-1 Stainless steel plate
400-2 Aluminum frame
450 Metallic member
500 Coolant gas

The invention claimed is:

1. A battery block, comprising:
a metallic case that includes a plurality of pipe-shaped members, each of the pipe-shaped members comprising a first brazed joint between mating faces of each of the pipe-shaped members; and
a plurality of unit cells that are accommodated in the plurality of pipe-shaped members, wherein the plurality of pipe-shaped members are joined to each other with a plurality of second brazed joints and are integrated with each other, wherein
each of the pipe-shaped members has a hollow interior and a protrusion at the mating faces, the protrusion protruding into the hollow interior of the pipe-shaped member, the protrusion extending continuously along the mating faces, wherein
the first brazed joint extends from the outer periphery surface of the pipe-shaped member to the hollow interior and is formed integrally with the protrusion as a brazing material, and
the protrusion is in contact with each of the plurality of unit cells.

2. The battery block according to claim 1, wherein each of the pipe-shaped members comprises a metallic plate including a core material and a brazing material layer.

3. The battery block according to claim 1, wherein each of the pipe-shaped members comprises aluminum, copper, brass, or stainless steel.

4. The battery block according to claim 1, wherein each of the pipe-shaped members is a circular pipe or a polygonal pipe.

5. The battery block according to claim 1, wherein each of the pipe-shaped members has a penetration slot or a notch portion.

6. The battery block according to claim 1, wherein a gap between the mating faces is 0.05 to 0.2 mm.

7. The battery block according to claim 1, wherein each protrusion suppresses vibration or rotation of the plurality of the unit cells accommodated in the plurality of the pipe-shaped members.

8. A method of manufacturing a battery block, the method comprising: a step of:
forming a plurality of pipe-shaped metallic plates having a brazing material layer on an outer circumferential surface by bending a plurality of metallic plates including a core material and the brazing material layer to constitute a plurality of corresponding mating faces;
forming an assembly of the plurality of pipe-shaped metallic plates by bringing the plurality of pipe-shaped metallic plates into contact with each other and fixing the plurality of pipe-shaped plates to each other;
forming a battery case by heating the assembly of the plurality of pipe-shaped metallic plates, brazing the plurality of corresponding mating faces of each of the plurality of pipe-shaped metallic plates to form a plurality of pipe-shaped members, and brazing the plurality of pipe-shaped metallic plates to each other, wherein each of the pipe-shaped members has a hollow interior and a protrusion at the mating faces, the protrusion protruding into the hollow interior of the pipe-shaped member; and
accommodating a unit cell in the hollow interior of each of the plurality of pipe-shaped members of the battery case such that the protrusion is in contact with the unit cell.

* * * * *